United States Patent

Saderholm et al.

[11] Patent Number: 5,722,684
[45] Date of Patent: Mar. 3, 1998

[54] HINGED MODULE COVER

[75] Inventors: Davin G. Saderholm, Salt Lake City; Brian M. Shaklik, Fruit Heights, both of Utah

[73] Assignee: Morton International, Inc., Chicago, Ill.

[21] Appl. No.: 658,330

[22] Filed: Jun. 5, 1996

[51] Int. Cl.$^6$ .................................................. B60R 21/16
[52] U.S. Cl. ............................... 280/728.3; 280/732
[58] Field of Search ........................... 280/728.2, 728.3, 280/731, 732

[56] References Cited

U.S. PATENT DOCUMENTS

| | | | |
|---|---|---|---|
| 3,643,971 | 2/1972 | Kushnick | 280/150 AB |
| 3,708,179 | 1/1973 | Hulten | 280/150 AB |
| 3,756,617 | 9/1973 | Brown | 280/732 |
| 4,941,678 | 7/1990 | Lauritzen et al. | 280/728.3 |
| 5,288,103 | 2/1994 | Parker et al. | 280/728 R |
| 5,301,966 | 4/1994 | Sakata | 280/728 |
| 5,316,334 | 5/1994 | Skidmore | 280/728 B |
| 5,383,681 | 1/1995 | Sato | 280/728 B |
| 5,393,089 | 2/1995 | Pakulsky et al. | 280/728 B |
| 5,398,960 | 3/1995 | Ravenberg et al. | 280/728 B |
| 5,407,226 | 4/1995 | Lauritzen et al. | 280/728 R |
| 5,411,288 | 5/1995 | Steffens, Jr. | 280/728.3 |
| 5,431,433 | 7/1995 | Steimke et al. | 280/728.3 |
| 5,470,097 | 11/1995 | Elqadah et al. | 280/728.3 |
| 5,474,325 | 12/1995 | Daines et al. | 280/728.3 |

Primary Examiner—Paul N. Dickson
Attorney, Agent, or Firm—Corinne R. Gorski; Gerald K. White

[57] ABSTRACT

A cover and housing assembly for a module of a vehicle safety restraint system including a cover having a pairs of doors. Each of the doors has an upper edge and a lower edge, joined by a seam of frangible material. An extruded housing includes a pair of sidewalls, each of the sidewalls having a free edge extending along a length thereof. A plurality of attachment segments are formed integrally with and spaced along a length of each of the doors, so as to form an open section between respective pairs of attachment segments. A plurality of attachment portions are formed integrally with and spaced along a length of each of the sidewalls so as to form a recessed section between respective pairs of attachment portions. Upon assembly of the cover and housing, each of the attachment segments of the doors is received within a respective recessed section of the housing and each of the attachment portions of the housing is received within a respective open section of the cover. Grooves in the attachment segments and portions are aligned to form a channel between each of the housing sidewalls and the pair of cover doors. An attachment rod extends through each channel to form a direct hinged connection between the sidewalls of the housing and the doors of the cover, upon deployment of the module, the doors separate along the frangible seam and pivot outwardly opening the housing, without causing material stress to the cover at the hinged connection.

7 Claims, 3 Drawing Sheets

HINGED MODULE COVER

BACKGROUND OF THE INVENTION

1. Field of the Invention

The present invention relates to an improved cover and inflator housing attachment assembly for a vehicle safety restraint system, and more particularly to a module cover which is hinged directly to an extruded housing and which rotates out of the way during deployment.

2. Description of the Related Art

An inflatable air bag or cushion is a well known device for protecting an occupant of a vehicle which has been involved in a collision. The cushion is housed in an air bag module which also includes a reaction canister or housing containing an inflator which upon actuation provides the gas to deploy or inflate the cushion, and a cover for closing the housing.

As fully set forth in U.S. Pat. No. 5,470,097, assigned to the assignee of the present invention, due to the forces created during deployment of the air bag, the doors of the cover member open rapidly and with great force. This can result in parts of the module, especially the cover, from separating and entering the passenger compartment.

Various approaches have been used to prevent such an occurrence, for example, tethering the cover to the reaction canister. Such arrangements invariably increase manufacturing and production costs, because of the complicated assembly procedures which are necessary to attach the cover doors to the remaining portions of the module.

It is known in the prior art to hingedly attach door panels of a module cover to a remaining portion of the cover or to a separate frame, which is then attached to the vehicle via a complex and time consuming attachment arrangement. U.S. Pat. No. 5,288,103 discloses an air bag module having a cover with an integral pair of doors pivotally connected to a remaining section of the cover. However, such an attachment structure limits the material that can be used to manufacture the cover and does not provide means for preventing the door panels from becoming detached during module deployment.

U.S. Pat. No. 5,393,089 discloses a module having a pair of doors each having a thinned, arcuate portion connected to the instrument panel of a vehicle, such that upon deployment, the doors pivot open about the thinned portions. Such an arrangement results in a weakened connection between the doors and the vehicle which can easily fracture during deployment. Moreover, with such an arrangement, the material that can be used to manufacture the cover is limited.

U.S. Pat. No. 5,316,334 discloses a module having a door which is pivotally attached to a frame via a pivot pin. The prior art recognizes the inherent problem of using hinged formations for attaching cover doors, due to the weakened nature of such formations. Therefore, in order to solve this problem, the prior art provides an additional frame which is secured to an opening in the vehicle. Such an assembly is complex, costly and time consuming, as the frame must be riveted or bolted to the vehicle. In addition, the interconnected arrangement between the door, frame and vehicle introduces additional weakened areas which can fail during deployment.

U.S. Pat. No. 3,708,179 discloses a cover of an air bag device which is pivotally connected to a frame assembly which is riveted between the housing of the device and a base member attached to the vehicle. The doors are not directly hinged to the housing, but through a plurality of riveted parts which increase the opportunity of material failure during deployment.

U.S. Pat. No. 3,643,971 discloses a vehicle safety device including an enclosure mounted within a vehicle. The enclosure has hinged covers which are held closed by impact-operated latches. Such a housing, cover assembly does not provide occupant protection from flying debris. Moreover, the impact sensing arrangement necessary to release the latches to open the cover doors is complex and expensive.

U.S. Pat. No. 5,411,288 discloses a door assembly for an inflatable restraint module. The pair of doors are hingedly connected to the housing via tabs of metal. An obvious disadvantage to such a design is that the metal tabs will not prevent the doors from becoming separated from the housing during deployment, increasing the risk of passenger injury. Another disadvantage is that the hinges much be attached to the doors and housing with fasteners, increasing assembly costs and time, as well as, providing another area of material weakness in the module. For example, if the tabs themselves do not fracture, the means for attaching the tabs to the covers and housings may fail.

U.S. Pat. No. 5,301,966 discloses a hinge connection between a lid and a housing of an air bag device. However, the hinged connection is not directly between the housing and lid. One end of a hinge plate is riveted to the housing and the lid pivots about a hinge pin disposed at an opposite end of the hinge plate. The riveted connection between the housing and hinge plate results in a weakened area, which can fail during deployment.

Given the prior art, there is a need for an airbag module where the cover is directly hinged to an extruded housing in a safe and secure manner which limits the areas of material failure, and which also permits the cover to open easily and remain attached to the housing when the module is deployed. Further, there is a need for a cover housing attachment assembly which does not rely on the strength or flexibility of the cover material.

SUMMARY OF THE INVENTION

It is an object of the present invention to overcome the deficiencies of the prior art by providing a cover-housing attachment which is strong enough to absorb the high loads produced upon deployment and to prevent damage to the vehicle and/or passenger from flying debris.

Another object of the present invention is to provide a cover housing attachment assembly which does not rely on the strength or flexibility of the cover material, but only on the relationship between the housing, hinge and cover. Once the cover doors break along the tear seam, there is comparatively little stress on the cover at the attachment area.

A further object of the present invention is to provide for the use of an extruded housing which is easier and cheaper to manufacture, because no rivets or small parts are required during assembly, and in some cases the module attach bracket can be eliminated.

Still another object of the present invention is to provide a cover, housing attachment assembly which reduces manufacturing costs and assembly times, by limiting the structure to a one-piece injection molded cover, a one-piece extruded housing and an elongated hinge, without the use of mounting frames and other riveted structures.

In accomplishing these and other objectives of the present invention, there is provided a cover and housing attachment assembly for a module of a vehicle safety restraint system including a cover having a pairs of doors. Each of the doors has an upper edge and a lower edge, the upper edges of the doors being joined by a seam of frangible material. An extruded housing includes a pair of sidewalls, each of the sidewalls having a free edge extending along a length thereof. A plurality of attachment segments are formed integrally with and extending from the lower edge of each of the doors. The attachment segments are spaced along a length of each of the doors, so as to form an open section between a pair of respective attachment segments. A plurality of attachment portions are formed integrally with and extend from the free edges of each of the sidewalls. The portions are spaced along a length of each of the sidewalls, so as to form a recessed section between respective pairs of attachment portions. Each of the attachment segments and the attachment portions include a groove, wherein upon assembly of the cover and housing, each of the attachment segments of the doors is received within a respective recessed section of the housing and each of the attachment portions of the housing is received within a respective open section of the cover. The grooves of the attachment segments and portions are aligned to form a channel between each of the housing sidewalls and the pair of cover doors. An elongated attachment rod extending through each channel to form a direct hinged connection between the sidewalls of the housing and the doors of the cover, wherein upon deployment of the module, the doors separate along the frangible seam and pivot outwardly about the rods opening the housing, without causing material stress to the cover at the hinged connection and preventing the doors from being separated from the housing.

Other features and advantages of the present invention will become apparent from the following description of the invention which refers to the accompanying drawings.

DETAILED DESCRIPTION OF THE PREFERRED EMBODIMENTS

The present invention relates to a cover and reaction canister or housing attachment assembly for a vehicle safety restraint system. The safety restraint system is mounted in a vehicle (not shown) and deploys upon a collision. It should be understood that the structural details and operation of the other components of the safety restraint system, such as the inflator, do not form a part of the present invention and will not be described further herein.

Figure 1:
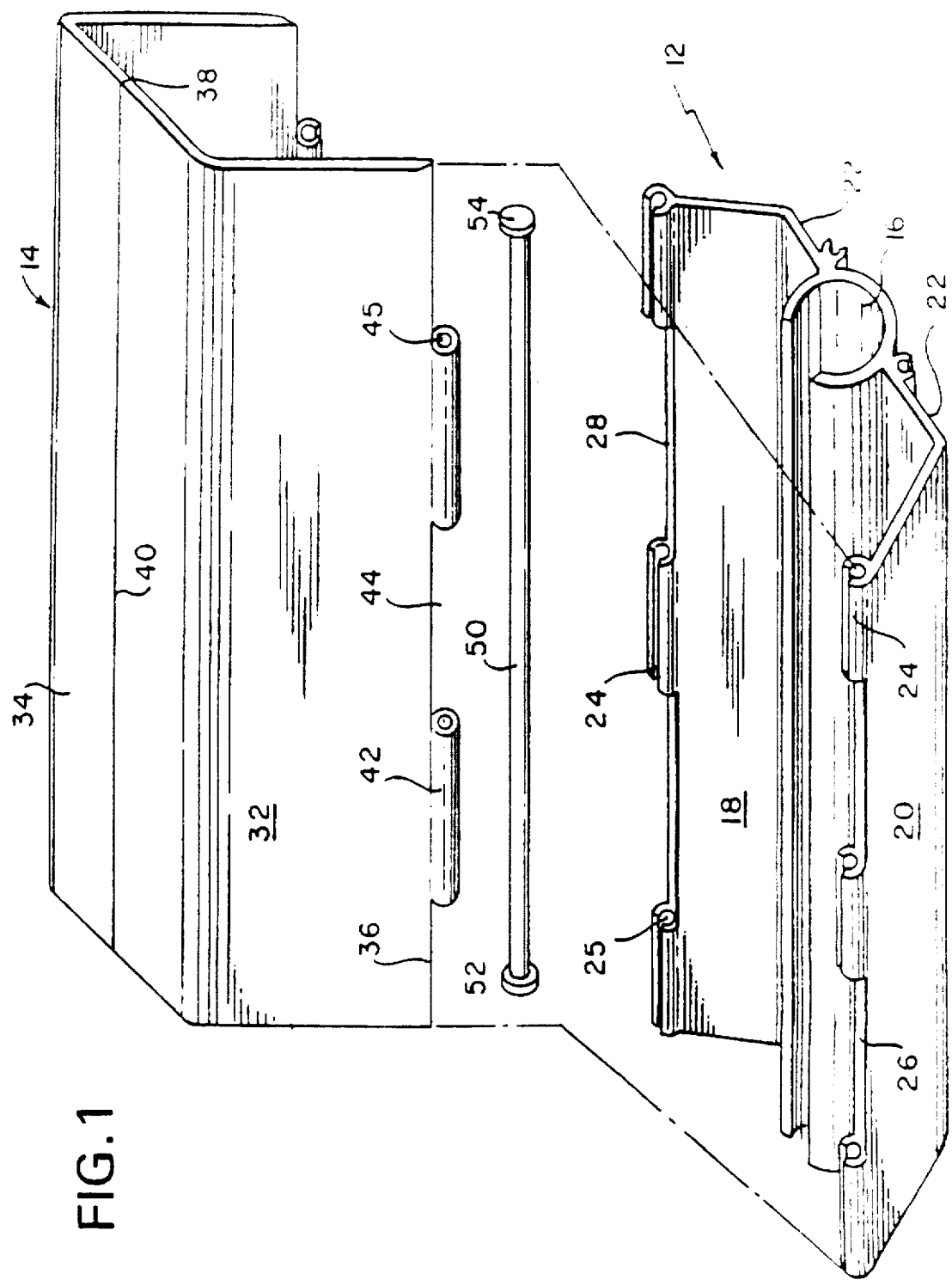
FIG. 1 is a perspective view of the cover, housing and hinge assembly of the present invention.

Referring to FIG. 1, there is illustrated a housing and cover assembly, generally designated by the reference numeral 10, which includes a one-piece extruded reaction canister or housing 12 and a one piece injection molded cover 14. Reaction canister housing 12 is extruded into a long, narrow, open trough form, from a range of materials, such as aluminum or a thermoplastic. During extrusion fabrication, the body of the housing is extruded into a continuous length of material having the necessary shape and features, such as the screw retaining grooves, formed integrally therewith. The continuous length can then be cut into various discrete lengths. It should be appreciated that the housing, cover attachment assembly of the present invention applies to a variety of different module constructions, for example, both a passenger and driver side assembly.

Housing 12 includes an integrally shaped inflator holder 16 of a generally circular cross-section for accommodating an inflator (not shown). First and second sidewall portions 18 and 20 are each joined to holder 16 by a base portion 22. Sidewalls 18, 20 are spaced apart and formed continuously with inflator holder 16 via base portion 22.

As will be described further herein, each sidewall portion 18, 20 includes a plurality of attachment portions 24 formed integrally with, spaced along and extending upwardly from a free end 26 of the sidewall. The portions 24 are separated by recessed sections 28 in an alternating manner along the length of the sidewalls. Each of the portions 24 include a groove 25. Each of the grooves 25 being in alignment to form a channel for receiving an attachment rod 50, which will be described further herein. Both the portions 24 and the grooves 25 can be formed during the extrusion process, and the recessed sections 28 formed in a later manufacturing step.

Figure 2:
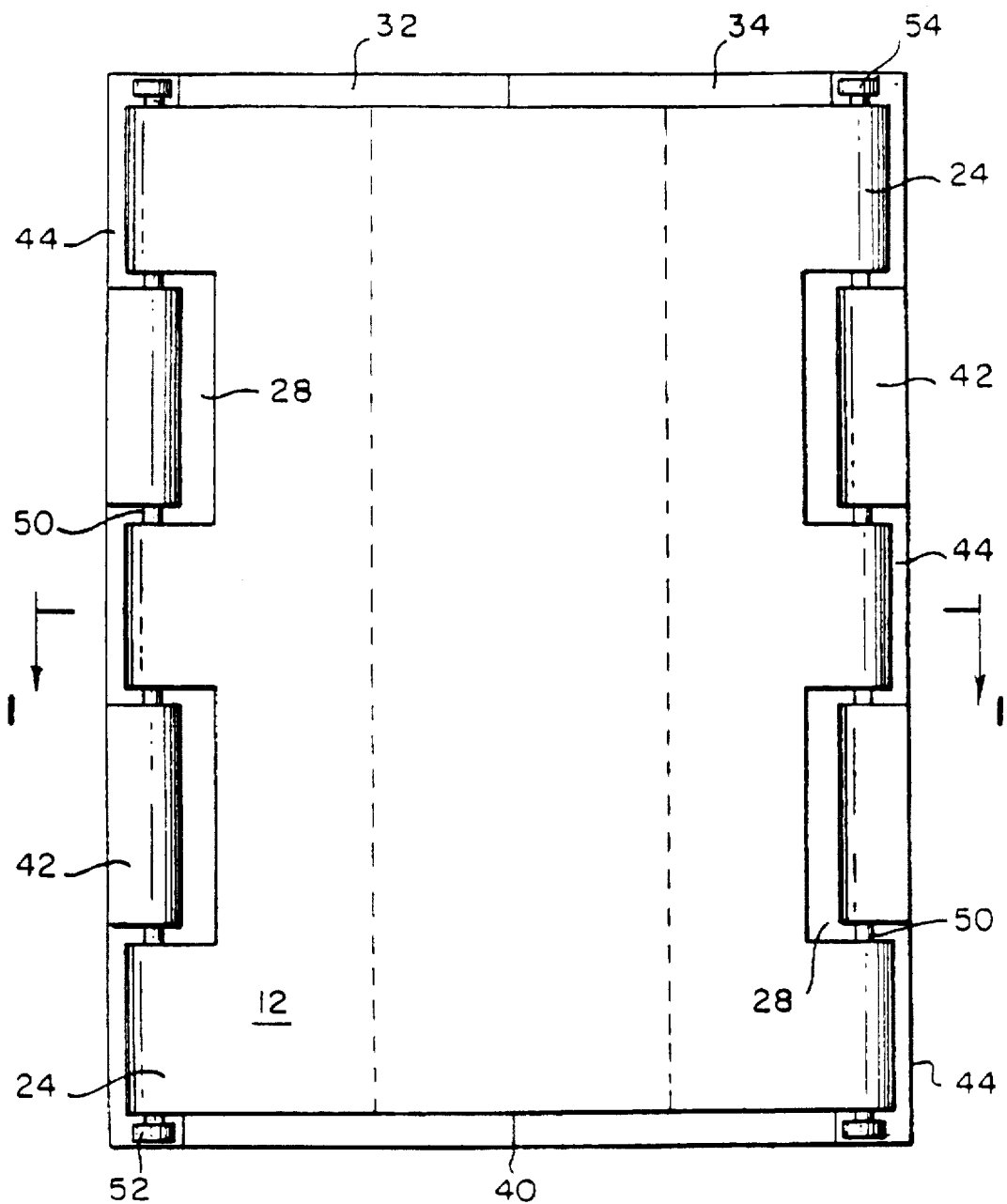
FIG. 2 is a bottom view of the assembled cover and housing.
Figure 3:
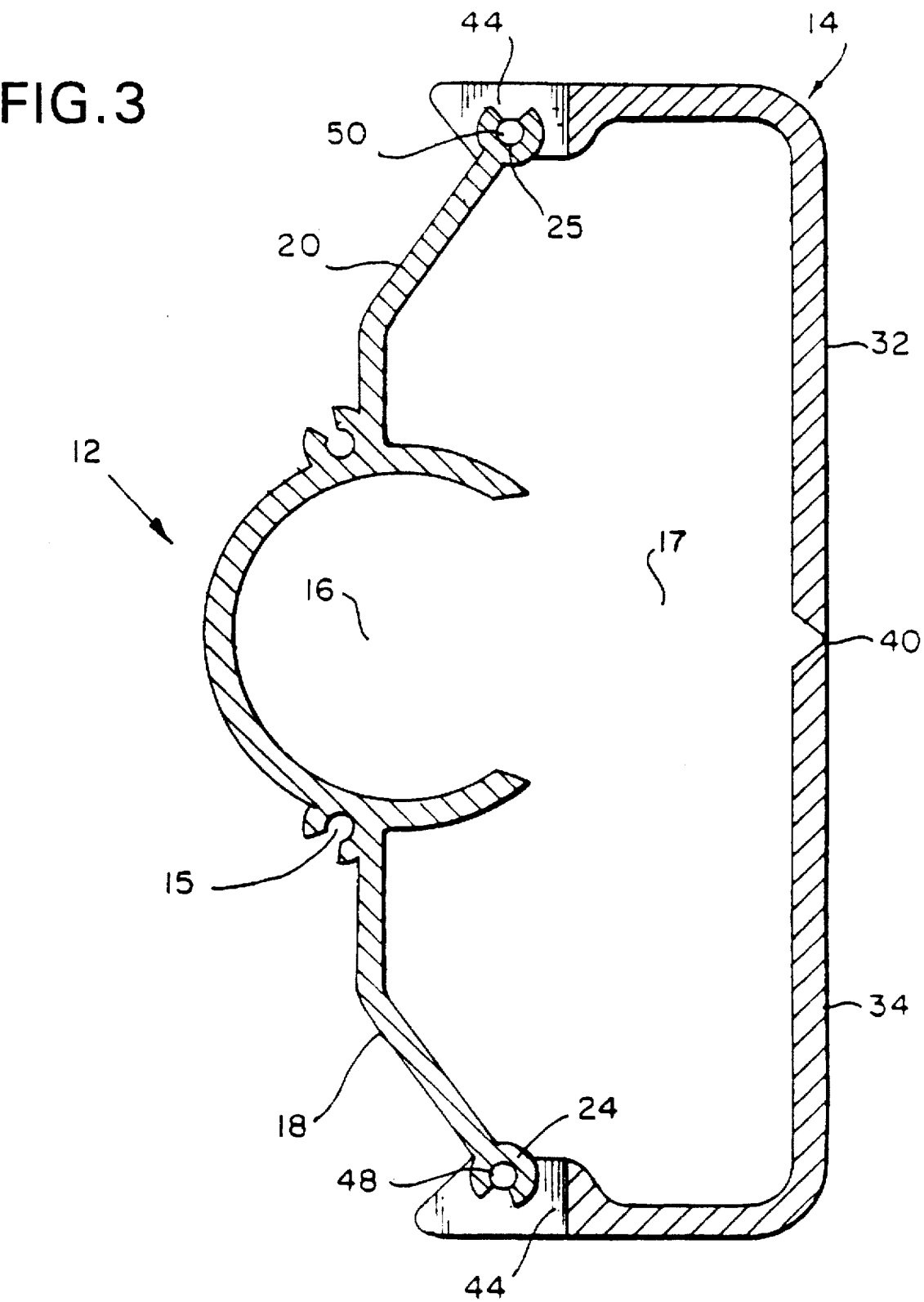
FIG. 3 is a cross-sectional view of the cover and housing assembly taken along line I—I of FIG. 2.

Referring to FIGS. 1–3, cover 14 comprises a pair of L-shaped doors 32, 34 joined by a tear seam 40. Cover door 32, 34 each include a first lower edge 36 and a second upper edge 38. The upper edges 38 of the doors 32, 34 are joined together by tear seam 40. In an unused state, the cover doors 32, 34 are in a closed position to protect a folded airbag (not shown) which is enclosed within a cushion packing area 17 (FIG. 3), formed by reaction canister 12 and cover 14. Upon deployment, the airbag inflates and the doors 32, 34 pivot outwardly, separating along seam 40.

Cover 14 is made of a hard plastic material, such as a thermoplastic urethane. Because of the hinged attachment assembly of the present invention, much harder materials, such as Dupont Dym and Tellar, can now be used for the cover material, providing increased strength in the attachment area.

Extending from the lower edge 36 of each of the doors 32,34 are a plurality of attachment segments 42 which extend downwardly from edge 30. Each of the segments 42 is bordered by an open section 44. As shown in FIGS. 1 and 2, segments 42 alternate with open sections 44 along the length of the side panels. Each of the segments 42 include a groove 45, wherein the grooves are aligned to form a channel 48 to receive attachment rod 50, see FIG. 3.

When the cover 14 and housing 12 are assembled, each of the attachment segments 42 of the cover is received in a respective recessed section 28 of the housing 12, and likewise, each of the attachment portions 24 of the housing is received in a respective open section 44 of the cover. Thus, the edges of the cover side panels and the housing side walls are flush with each other when the cover and housing are assembled, as shown in FIG. 2.

When the cover and housing are assembled the grooves 25 of portions 24 of the housing align with the grooves 45 of segments 42 of the cover, forming channel 48 to receive attachment rod 50. Attachment rod 50 is made of a material such as steel or a hard plastic, for example, nylon. Rod 50 extends continuously through the portions 24 and segments 42 to form a hinge along each side of the assembly. Attachment rod 50 has a first headed end 52. After insertion of the rod, a second headed end 54 can be crimped, for example, the rod may be heated and head 54 attached thereto, to keep the rod from sliding from the assembly. The rod can have a diameter within the range, for example, of and about 1/16 to 1/8 of an inch. Moreover, grooves 25 and 45 can have a diameter in the range, of and about 1/16 to 1/8 of an inch, as well. Grooves 25 of housing 12 have a slightly loose fit with rod 50. However, grooves 45 of cover 14 have a tighter fit with rod 50, to provide a more controlled rotation upon opening of the cover door panels.

When assembled, cover 14 and housing 12 are further joined by a pair of end plates (not shown), as is known in the prior art. Housing 12 includes end plate mounting grooves 15, see FIG. 3. With the hinged attachment of the present invention, the end plates cover 14 and further control the opening thereof.

Next referring to FIGS. 1–3, the operation of the attachment assembly of the present invention will be described. During deployment, gas is discharged from the inflator and the bag is inflated outwardly against the cover. Tear seam 40 ruptures and doors 32 and 34 open and pivot outwardly about the hinge formed by rod 50, housing attachment portions 24 and cover attachment segments 42. Because the hinge replaces the cover material itself to allow the cover doors to rotate out of the way during deployment, less stress is created at the cover hinge area, reducing the amount of material failures in this area. Thus, materials which are cheaper and much harder than the prior art cover materials can be used.

Next a method of assembling the cover and housing of the module will be described. The cover is injection molded in a single piece. The housing is extruded from a length of material, such as aluminum. By extrusion, the sidewalls 18, 20, the inflator housing 16 and the base portion 22 can be formed in a single step. In order to form the attachment portions 24 along the a length of each of the sidewalls 18, 20, after extrusion, the recessed sections 28 can be cut out along the free edge of the sidewalls. Once the alternating attachment portions or segments and the open or recessed sections are formed along the cover and housing the two components are connected together.

Each of the attachment segments 42 of the doors is received within a respective recessed section 28 of the housing and each of the attachment portions 24 of the housing is received within a respective open section 44 of the cover. Upon connection, the grooves 45 of the attachment segments 42 and the grooves 25 of the attachment portions 24 form a channel 48 between each of the housing sidewalls 18, 20 and the cover doors 32, 34. The attachment rod 50 can then be inserted through each channel 48 to form a direct hinged connection between the sidewalls of the housing and the doors of the cover. As previously described, one end 52 is headed. After insertion, the second end 54 can be crimped so that the rod does not slide out of the channels.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A cover and housing attachment assembly for a module of a vehicle safety restraint system comprising:
    a one-piece cover having a pair of integral doors connected together at one edge by a frangible seam and each of the doors having an opposed free edge;
    a one-piece housing including a pair of monolithic sidewalls, each of the sidewalls including a free edge extending along a length thereof;
    a plurality of attachment segments formed integrally with and extending from the free edge of each of the cover doors;
    a plurality of attachment portions formed integrally with and extending from the free edge of each of the sidewalls; and
    means for hingedly connecting the attachment segments of the cover doors directly to the attachment portions of the sidewalls and for preventing the cover doors from being separated from the housing sidewalls during deployment, wherein upon deployment of the module, the cover doors separate along the frangible seam and pivot outwardly opening the housing, causing no material stress to the cover.

2. The cover and housing attachment assembly of claim 1, wherein the plurality of attachment segments are spaced along a length of each of the cover doors so as to form an open section between a respective pair of attachment segments.

3. The cover and housing attachment assembly of claim 2, wherein the plurality of attachment portions are spaced along a length of each of the sidewalls so as to form a recessed section between a respective pair of attachment portions.

4. The cover and housing attachment assembly of claim 3, wherein each of the plurality of attachment segments and each of the plurality of attachment portions include a groove, wherein upon assembly of the cover and housing each of the attachment segments of the doors is received within a respective recessed section of the housing and each of the attachment portions of the housing is received within a respective open section of the cover, and the grooves of the attachment segments and portions are aligned to form a channel between each of the housing sidewalls and the each of the cover doors.

5. The cover and housing attachment assembly of claim 4, wherein the connecting means comprises an attachment rod extending through each channel to form a direct hinged connection between the sidewalls of the housing and the doors of the cover.

6. A cover and housing attachment assembly for a module of a vehicle safety restraint system comprising:
    a one-piece cover including a pair of integral doors, each of the doors having an upper edge and a lower edge, the upper edges of the doors being joined by a seam of frangible material;
    a one-piece extruded housing including a pair of monolithic sidewalls, each of the sidewalls having a free edge extending along a length thereof;
    a plurality of attachment segments formed integrally with and extending from the lower edge of each of the cover doors, the segments being spaced along a length of each of the doors so as to form an open section between a respective pair of attachment segments;
    a plurality of attachment portions formed integrally with and extending from the free edges of each of the sidewalls of the housing, the portions being spaced along a length of each of the sidewalls so as to form a recessed section between a respective pair of attachment portions;
    each of the attachment segments and the attachment portions including a groove, wherein upon assembly of the cover and housing each of the attachment segments of the doors is received within a respective recessed section of the housing and each of the attachment portions of the housing is received within a respective open section of the cover, and the grooves of the attachment segments and portions are aligned to form a channel between each of the housing sidewalls and each of the cover doors; and an attachment rod extending through each channel to form a direct hinged connection between the sidewalls of the housing and the doors of the cover, wherein upon deployment of the module, the doors separate along the frangible seam and pivot outwardly opening the housing, causing no material stress to the cover at the hinged connection preventing the cover doors from being separated from the housing sidewalls during deployment.

7. The cover and housing attachment assembly of claim 1, wherein the cover is made of a thermoplastic urethane.

* * * * *